United States Patent
Clark et al.

(10) Patent No.: US 6,380,744 B2
(45) Date of Patent: Apr. 30, 2002

(54) SHIELDING APPARATUS FOR SELECTIVE ATTENUATION OF AN ELECTROMAGNETIC ENERGY FIELD COMPONENT

(75) Inventors: Brian Clark, Sugar Land; Richard A. Rosthal, Houston; Dean M. Homan, Sugar Land; Dzevat Omeragic, Sugar Land; Stephen D. Bonner, Sugar Land; Scott S. Chesser, Richmond; Thomas D. Barber, Houston, all of TX (US)

(73) Assignee: Schlumberger Technology Corporation, Houston, TX (US)

( * ) Notice: Subject to any disclaimer, the term of this patent is extended or adjusted under 35 U.S.C. 154(b) by 0 days.

(21) Appl. No.: 09/932,249

(22) Filed: Aug. 17, 2001

Related U.S. Application Data (62) Division of application No. 09/452,660, filed on Dec. 1, 1999.

(51) Int. Cl.[7] ................................................ G01V 3/30
(52) U.S. Cl. ........................................................ 324/338
(58) Field of Search ................................ 324/338–343, 324/346, 356, 369; 336/84 R, 84 M, 84 C, 84 G; 343/841, 885

(56) References Cited

U.S. PATENT DOCUMENTS

| | | |
|---|---|---|
| 3,851,830 A | 12/1974 | Barthalon .................. 242/7.03 |
| 4,536,714 A | 8/1985 | Clark ........................... 324/338 |
| 4,949,045 A | 8/1990 | Clark et al. ................. 324/338 |
| 5,115,198 A | 5/1992 | Gianzero ..................... 324/339 |
| 5,508,616 A | 4/1996 | Sato et al. ................... 324/343 |
| 5,757,191 A | 5/1998 | Gianzero ..................... 324/339 |

FOREIGN PATENT DOCUMENTS

| WO | WO 98/00733 | 1/1998 |
|---|---|---|

*Primary Examiner*—Edward Lefkowitz
*Assistant Examiner*—Reena Aurora
(74) *Attorney, Agent, or Firm*—John J. Ryberg; Victor H. Segura (57) ABSTRACT

A shield apparatus for use in conjunction with a well tool to selectively attenuate one or more electromagnetic energy field components as the components interact with the shield. The shield composed of a flexible strip or conductive body and comprising at least one sloped slot or sloped conductive element therein. The shield being adapted to surround an antenna mounted on a well tool. A method for rotating the axis of the magnetic dipole of a transmitter or receiver coil. A method for winding and shielding an electric coil such that the resultant coil emits or receives selected electromagnetic energy field components.

17 Claims, 6 Drawing Sheets

SHIELDING APPARATUS FOR SELECTIVE ATTENUATION OF AN ELECTROMAGNETIC ENERGY FIELD COMPONENT

CROSS-REFERENCES

The present application is a divisional of U.S. patent application Ser. No. 09/452,660, filed Dec. 1, 1999.

BACKGROUND OF THE INVENTION

1. Field of the Invention

This invention relates to the field of well logging tools of the type wherein electromagnetic ("EM") energy is used for measuring characteristics of formations surrounding a borehole. More particularly, this invention relates to an improved antenna coil shield for use in such tools to provide selective attenuation of the EM waves emitted or received by the antenna.

2. Description of Related Art

Induction and propagation well tools have been employed in logging operations for many years to measure the properties of subsurface formations surrounding an earth borehole. In conventional logging techniques, a number of antennae or coils are mounted on a well tool. An alternating current energizes one or more transmitter coils to emit EM energy into the formations. The emitted energy propagates through the formations or induces currents in the formations surrounding the borehole. The EM energy or currents are detected and measured by one or more receiver coils on the tool. The measured EM signals are processed to determine the electrical properties, such as permittivity or conductivity, of the formations.

Figure 1A:
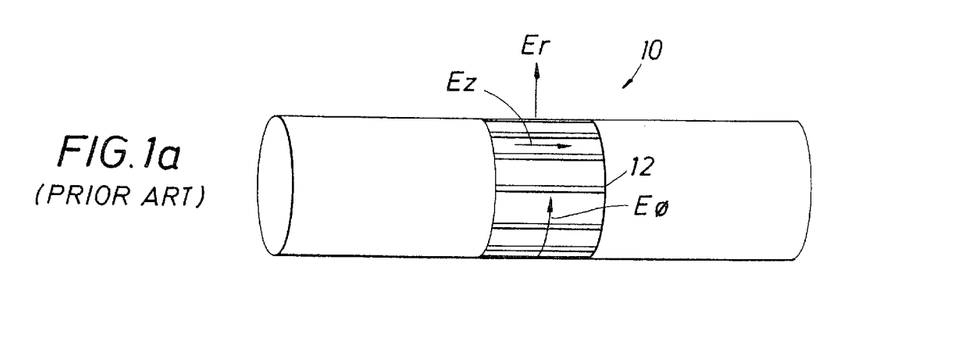
FIG. 1a is a schematic diagram of a conventional cylindrical shield with axial slots. Directed arrows are representative of the interaction between the shield and the electric field components of incident electromagnetic energy.
Figure 1B:
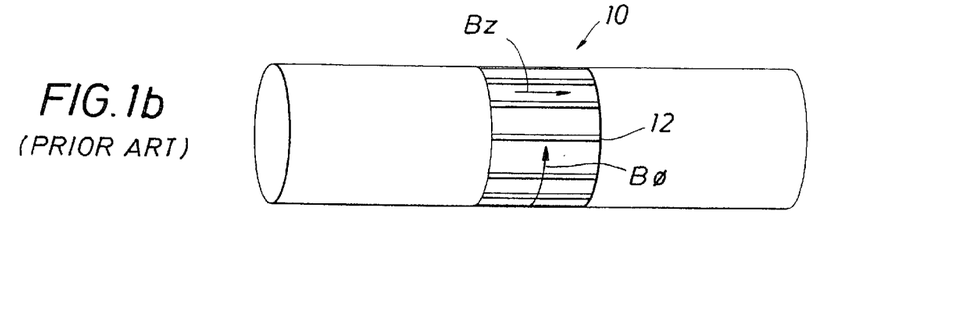
FIG. 1b is a schematic diagram of a conventional cylindrical shield with axial slots. Directed arrows are representative of the interaction between the shield and the magnetic field components of incident electromagnetic energy.

If the transmitter and receiver coils on these tools were perfectly configured and balanced in a theoretically ideal system, the EM energy emitted by the coils would propagate in a mode known as a transverse electric ("TE") mode, of the type generated by an ideal vertical magnetic dipole in an azimuthally symmetric media. However, under actual operating conditions, there are various factors that give rise to the generation of significant undesired EM field components. One approach to alleviating this problem is with the use of antenna shields to reduce the transmission and/or reception of spurious and unwanted EM field components. These shields are typically used in conjunction with each coil on the tool. U.S. Pat. Nos. 4,536,714 and 4,949,045 (both assigned to the assignee of the present disclosure) disclose conventional antenna shields employed in these well tools to provide mechanical protection for the coils and to guarantee the passage of desired EM field components. As shown in FIG. 1a, these shields 10 are in the form of a metal cylinder that has slots 12 in the axial direction. The slot 12 pattern allows the azimuthal electric field (E$\phi$) component of the EM energy to pass, but prevents radial (Er) and axial (Ez) electric field components from passing through the shield, either from within (in the case of a transmitter) or from without (in the case of a receiver). An alternative viewpoint is to represent each axial slot 12 as an axial magnetic dipole, as shown in FIG. 1b. These magnetic dipoles are sensitive to axial magnetic fields (Bz), but they are not sensitive to azimuthal magnetic (B$\phi$) fields. The shielded coils are thus rendered insensitive to parasitic transverse magnetic ("TM") EM fields associated with borehole modes, and which have radial (Er) and axial (Ez) electric fields and azimuthal magnetic fields (B$\phi$).

Recent publications in the field of well logging have described the implementation of tools with triaxial coils. Such coil configurations involve three coils with magnetic moments that are not co-planar. U.S. Pat. Nos. 5,508,616, 5,115,198, 5,757,191 and PCT Application WO 98/00733, Bear et al., describe logging tools employing such coil configurations. Common to these apparatus and techniques, however, is the need to manipulate the antenna coil itself. None of these disclosures address the implementation of antenna shields as alternative means to achieve selective EM energy attenuation.

It is desirable to rotate the axis of the magnetic dipole of a transmitter or receiver coil without having to tilt the axis of the coil in relation to the tool axis. The benefits of such a technique include reductions in manufacturing and re-tooling costs, as well as shorter production times. Still further, it is desired to implement a shield apparatus that can be used in conjunction with tilted and non-tilted coils to rotate the axis of the magnetic dipole.

SUMMARY OF THE INVENTION

A shield apparatus adapted for use in conjunction with a well tool is provided to selectively attenuate one or more electromagnetic energy field components as the components interact with the shield.

In a first aspect of the invention, a shield containing a sloped slot pattern is provided to surround a coil. The shield attenuates selected electromagnetic energy field components as they interact with the shield to pass the desired components and restrict unwanted components.

In a second aspect of the invention, a strip is provided to surround a coil. The strip contains conductive elements configured in a sloped pattern. The strip thereby attenuates selected electromagnetic energy field components as they interact with the shield to pass the desired components and restrict unwanted components.

In a third aspect of the invention, a method for rotating the axis of the magnetic dipole of a transmitter or receiver coil is provided.

In a fourth aspect of the invention, a method for winding and shielding an electric coil is provided. The resulting coil emits or receives selected electromagnetic energy field components.

BRIEF DESCRIPTION OF THE DRAWINGS

Other aspects and advantages of the invention will become apparent upon reading the following detailed description and upon reference to the drawings in which.

DESCRIPTION OF ILLUSTRATIVE EMBODIMENTS

In the interest of clarity, not all features of actual implementation are described in this specification. It will be appreciated that although the development of any such actual implementation might be complex and time-consuming, it would nevertheless be a routine undertaking for those of ordinary skill in the art having the benefit of this disclosure.

As discussed above, conventional shields used in well tools universally have slots that are aligned along the longitudinal axis of the tool. The orientation of the slots is perpendicular to the electric field generated by the coil within or the field that is to be detected by the receiver. If the incident field has an unwanted component of the electric field that lies along the slot, then currents will flow in the metal to cancel that field and only the normal component will remain. For conventional induction or propagation tools, the desired electric field is azimuthal, and longitudinal slots allow that field to pass. If the coil was wound at an angle θ to the axis of the tool, then the desired electric field is no longer azimuthal, but rather has both azimuthal and longitudinal components that vary as a function of the azimuthal position.

Figure 2:
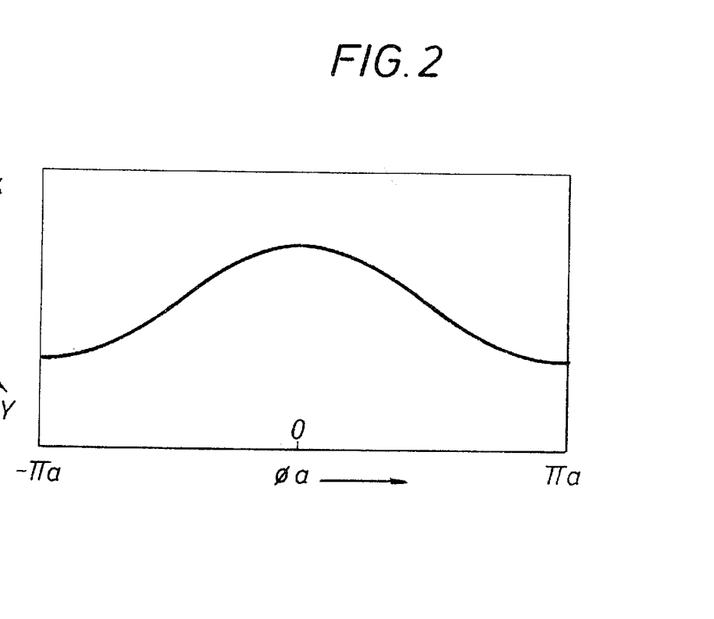
FIG. 2 is a schematic diagram of a coil wound at an angle $\theta$ to the longitudinal axis of well tool. Also depicted is a view of the tilted coil as projected onto a two-dimensional surface.

FIG. 2 illustrates a coil 14 wound at an angle θ to the longitudinal axis (represented by dashed lines) of the tool and having radius α. Projecting the coil 14 onto a two-dimensional surface as shown, the height of the coil 14 is described by a sinusoidal function of the azimuthal angle around the tool ϕ:

$$f(\phi) = \alpha \tan \theta \cos \phi. \tag{1}$$

An actual coil would probably have multiple windings, described by equation (1), but with an additional term pϕ, where p is the pitch. Effective shields for such coil configurations should preserve both the mechanical advantages and the EM advantages offered by conventional shields.

Sloped Slot Pattern

Figure 3:
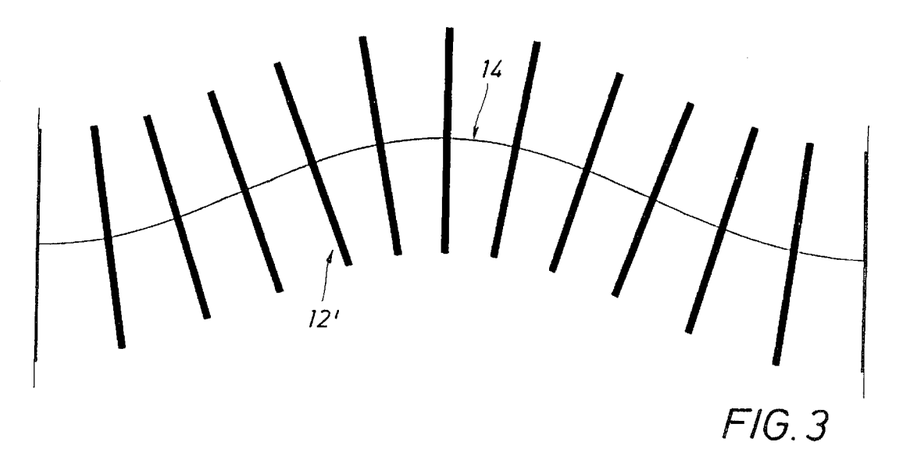
FIG. 3 is a schematic diagram of a sloped slot pattern superimposed onto a tilted coil and projected onto a two-dimensional surface. The slots are maintained perpendicular to the coil winding(s).

A shield to let pass the desired EM field components, and attenuate the undesired ones, should have at least one sloped slot that is sloped at an angle θ with respect to the tool axis. A sloped slot pattern for a tilted coil 14, projected onto a two-dimensional surface, is shown in FIG. 3. The slots 12' are perpendicular to the coil 14 at the intersection of the slot 12' and coil 14. This allows the electric field component that is parallel to the coil 14 to pass through the shield with minimal attenuation. This electric field will have azimuthal and axial components, but no radial component. The slope of the slot 12' is given by $$1/(\alpha \tan \theta \sin \phi). \tag{2}$$

Alternatively, one can represent the slots 12' as point magnetic dipoles on the surface of a conducting cylinder (not shown). The location of each magnetic dipole is given by equation (1), and their orientation is given by equation (2). Each individual magnetic dipole has an axial component and a smaller azimuthal component.

Figure 4:
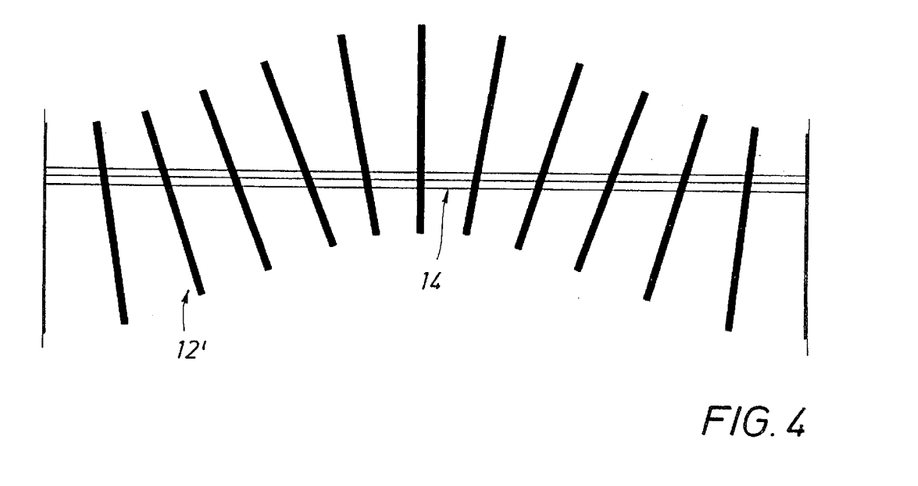
FIG. 4 is a schematic diagram of a sloped slot pattern superimposed onto a non-tilted (axial) coil and projected onto a two-dimensional surface.

While the above discussion has assumed that the coil under the shield is tilted at an angle θ with respect to the tool axis, the shields 10 of the present invention can also be used with an axial coil 14. With this configuration, the axis of the magnetic dipole of the coil can be selectively rotated. FIG. 4 illustrates a sloped slot 12' pattern superimposed onto an axial coil 14 and projected onto a two-dimensional surface. This configuration will deviate from the configuration of FIG. 3.

Figure 5:
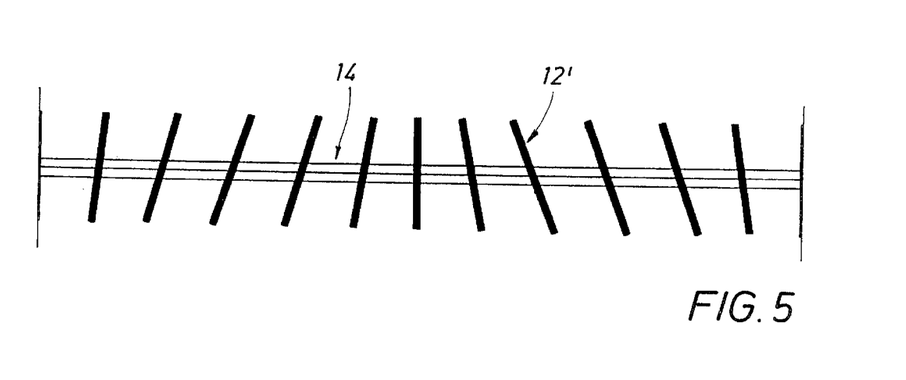
FIG. 5 is a schematic diagram of the sloped slot pattern of FIG. 4 with the slots maintained centered over the coil winding(s).

As shown in FIG. 4, the slots 12' are no longer perpendicular to the coil 14 windings. This may affect the relative strength of the transverse magnetic dipole ("TMD") component to the axial magnetic dipole component. One approach to minimize these effects would be to maintain the slots 12' centered over the coil 14, as shown in FIG. 5. FIG. 5 also shows a sloped slot 12' pattern superimposed onto an axial coil 14 and projected onto a two-dimensional surface. Although the coil 14 in FIG. 4 is shown comprising multiple windings, it will be understood by those skilled in the art that the shields of the present invention are effective with coils 14 composed of one or more windings.

While FIGS. 3–5 show straight slots 12', in general the slots 12' are curved in order to maintain the direction of the slots 12' perpendicular to the directions of the winding(s) or to keep them perpendicular to the desired direction of the electric field that is to pass through the shield without attenuation.

Surrounding an axial coil 14 with a shield of the present invention will produce transverse magnetic fields. Only the component of the electric field perpendicular to the slot 12' will pass through the shield; the components parallel to the slot 12' will be attenuated. The electric field that passes through the slots 12' is in the direction that would result from a true tilted coil. Basically, the shield functions as a polarizer that passes components of the EM field corresponding to a magnetic dipole oriented at an angle tilted relative to the tool axis.

Figure 6:
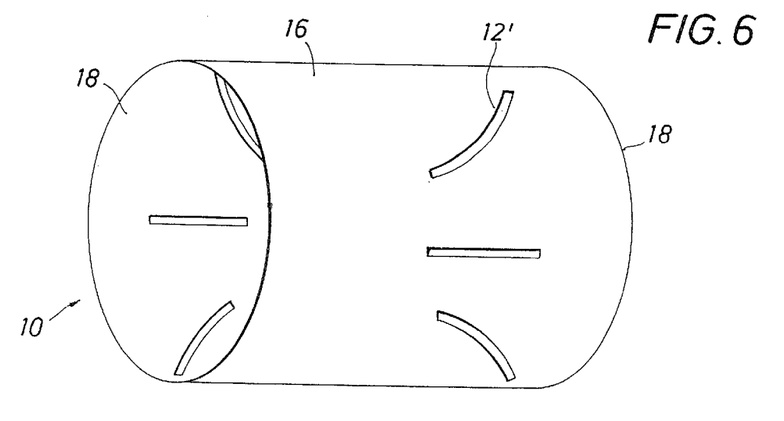
FIG. 6 is a perspective view of a cylindrical shield in accord with the present invention.

FIG. 6 shows an embodiment of a shield 10 of the present invention. One embodiment of the shield 10 entails a hollow body 16 formed of a conductive material, typically metal. The shield 10 has apertures 18 at its ends through which the tool body (not shown) passes. Typical well tools contain an elongated metallic pipe as a central support means upon which sensors, electronics, and other instrumentation are mounted. It will be understood that other support means, such as coiled tubing or non-metallic pipes, may be used to implement the present invention, as the precise type of support means is immaterial here. The hollow body 16 may be open-ended or closed-ended. The body 16 is generally formed in the shape of a surface of revolution. A cylinder is preferred, although other shapes, such as an ellipsoid of revolution may be employed. Preferably, a shield 10 will independently surround each coil on the well tool. The shield 10 may be mounted on the well tool in a suitable manner as know in the art.

The EM radiation pattern around a logging tool may be affected by the tool itself, so optimum shield 10 operation may require fine tuning the exact slot 12' pattern. Modeling shows that borehole eccentricity can have a large deleterious effect on a measurement using TMDs. Eccentered TMDs can couple directly into TM borehole modes via the TM mode's azimuthal magnetic field (Bφ). Since a tilted coil 14 can be represented as a vector sum of an axial magnetic dipole and a transverse magnetic dipole, it will also be susceptible to large eccentricity effects.

Figure 7A:
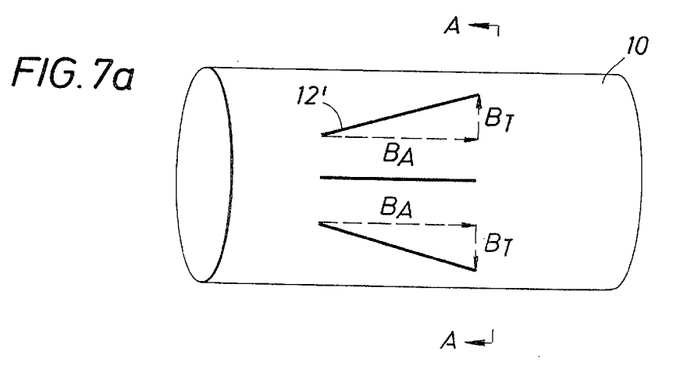
FIG. 7a is a schematic diagram of a cylindrical shield in accord with the invention. Dashed arrows represent the axial magnetic dipole and transverse magnetic dipole components associated with the slot pattern of the shield.

However, the shield 10 configurations of the present invention will provide some immunity to the TM mode, so the eccentricity effects may be reduced in severity. FIG. 7a shows the axial magnetic dipole component $B_A$ and the transverse magnetic dipole component $B_T$ associated with each slot 12'. As shown in FIG. 7a, the slot 12' pattern provides for some cancellation of opposing transverse magnetic dipole components $B_T$.

Figure 7B:
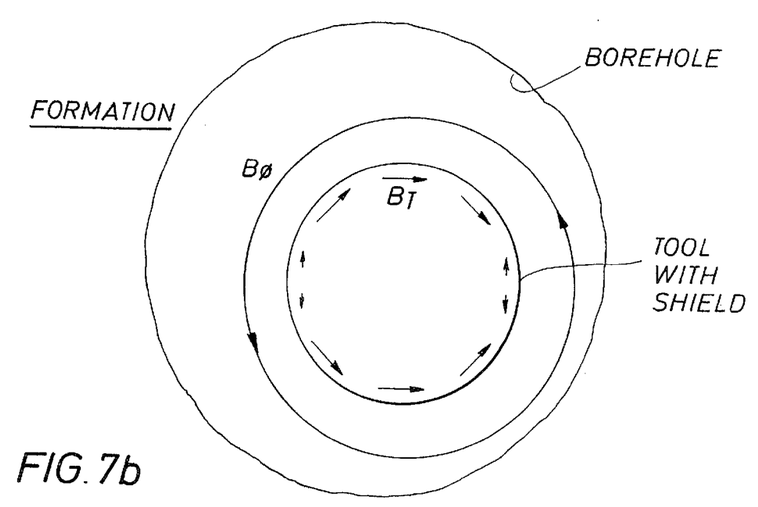
FIG. 7b is an overhead cross-section of a tool with the shield of FIG. 7a as seen along line A—A when the tool is in a borehole.

FIG. 7b is an overhead view of a tool with the shield of FIG. 7a as seen along line A—A when the tool is in a borehole. As shown in FIG. 7b, the TM mode's azimuthal magnetic field (Bφ) may couple to the transverse magnetic dipole components $B_T$ of the slots 12'. The TM mode's radial electric field (Er) will not penetrate the shield 10, so the coil 14 will not sense this.

The transverse magnetic dipoles vary with azimuth φ as sin φ. The TM mode's magnetic field may be written as $$B_\phi(\phi)=B_0+B_1 \sin \phi+B_2 \sin 2\phi+\ldots \quad (3)$$

The field $B_0$ will not be detected by the coil 14 because $B_0$ is an even function of φ, while the transverse magnetic dipoles are an odd function of φ. The same is true for $B_2 \sin 2\phi$. However, $B_1 \sin \phi$ is an odd function of φ, so it will be detected by the coil 14. Assuming that the conductivity of the tool is many orders of magnitude larger than the borehole fluid or the formation, the azimuthal magnetic field (Bφ) will not vary much with azimuth φ. Hence, $B_0 \gg B_1, B_2$, so that the TM coupling to the slots 12' will be very small on average.

Modifications may be made to the shield 10 or the coil 14 to alter the azimuthal amplitude of incident EM energy or the angle of rotation of the magnetic dipole. Multiple shields 10 may be overlaid coaxially around a coil 14. Combinations of sloped and axial slots of varying length, width, thickness, orientation, symmetry, density, or spacing may be formed on a shield 10 . The sloped slots 12' may have equal or varied slope angles. The slots 12' may be partially or entirely filled with some sort of lossy (i.e., conductive) material. A conductive element, such as a metallic strap or wire, may be connected between the sides of a slot 12' to partially short out the slot 12'.

A shield 10 of the invention may also be formed comprising two halves or several sections configured to form a surface of revolution when combined (not shown). Such a configuration may further comprise one section or one half of the shield 10 being electrically isolated from the other half or other sections. The spacing between the coil and its support means or the spacing between the coil and the shield 10 may also be varied. It will be appreciated by those skilled in the art having the benefit of this disclosure that other modifications may be employed to increase the efficiency of the shield 10.

Strip Shield

Figure 8:
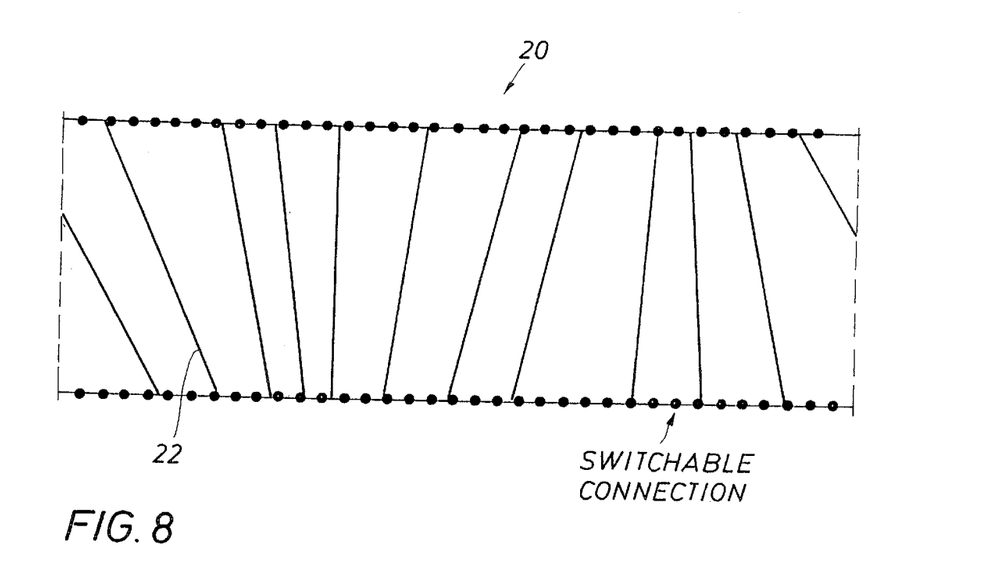
FIG. 8 is a schematic diagram of a shield composed of a strip in accord with the present invention. The strip is shown projected onto a two-dimensional surface.

FIG. 8 illustrates another embodiment of the present invention. A shield may be implemented in the form of a strip 20, also referred to as a flex circuit. The strip 20 is shown projected onto a two-dimensional surface for clarity of illustration. An effective strip 20 may be formed of any suitable non-conductive material that can be adapted to coaxially surround a coil. The strip 20 is preferably flexible, but it may also be formed of a rigid material. The strip 20 contains at least one conductive element 22, preferably a multitude of elements 22. The conductive elements 22 may be formed of fine strips of copper or other suitable conductive materials.

As described above, a shield incorporating sloped slots may be used to rotate the magnetic moment of a coil 14. Thus, the conductive elements 22 are disposed in the strip 20 such that each element 22 is sloped at an angle with respect to the tool axis when the strip is mounted on the tool to surround a coil. Since the strip 20 is non-conductive (unlike the shield embodiments described above), the elements 22 must also be configured to form a loop around the coil when the strip surrounds the coil. The loop provides the path in which currents can flow around the coil in order to rotate the axis of the magnetic dipole. The strip 20 provides selective attenuation of the EM energy emitted or received by a coil when a complete loop is formed around the coil by the conductive element 22.

A switchable connection is provided in the strip 20 to selectively open or close the loops formed by the conductive elements 22, as illustrated in FIG. 8. This connection may be a series of connections or only one connection. The connection(s) may also be located at any suitable point in the circuit. When the connection is closed, the element 22 acts to rotate the magnetic dipole of the coil. When it is open, it has no effect. One form of a switchable connection utilizes a MosFET switch to open or close the current path around the coil. Other suitable means may be utilized to form the switchable connection(s) as known in the art. The strip 20 may also comprise additional switching means (not shown) to provide an electrical short with the mandrel of a well tool if needed.

The modifications described above may also be made to the strip 20 or the coil to alter the azimuthal amplitude of incident EM energy or the angle of rotation of the magnetic dipole. Multiple layers of conductive elements 22 having different directions of magnetic dipole moments may also be disposed on the strip 20. This would allow the use of a single axial coil 14 as a transmitter or receiver and by closing the switchable connection(s) on the strip 20, different rotations of the magnetic moment could be achieved. Alternatively, multiple strips 20 could be overlaid coaxially to surround a coil.

Transverse Magnetic Dipoles

By altering the direction of the magnetic dipole, a coil can be used to make formation measurements at multiple orientations. This section describes a method for winding and shielding a coil structure to produce a set of TMDs in accord with the present invention.

Figure 9:
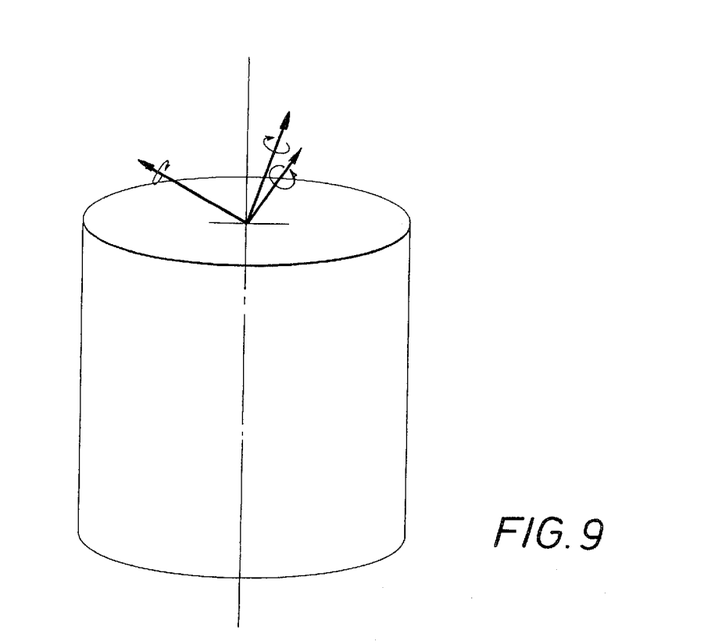
FIG. 9 is a schematic diagram representative of a set of transverse magnetic moments oriented about a longitudinal axis.

By superimposing or overlaying three coils around a non-conductive support means and wrapping the coils with one or more strips 20, a set of transverse dipoles may be produced. FIG. 9 illustrates a set of magnetic moments directed along three orthogonal directions at an equal angle to the longitudinal axis of the tool. With this configuration, the three coils and their corresponding strip(s) 20 can be turned on or off independently. This allows for any one coil and polarizer pair to be engaged, while the other two sets are disengaged.

The construction of a coil and polarizer strip 20 for the simplest case (which would be just one coil and its corresponding polarizer) will now be described. The coil may be wound around a non-conductive support means (such as an insulated tool mandrel) from any suitable conductive wire as known in the art. Referring to FIG. 2, to produce a magnetic dipole at some angle Φ between 0° and 90°, the location of the center of the thread should follow $$Z(\phi) = -\alpha \tan\Phi \cos\phi + p\phi, \quad (4)$$

where α is the radius of the support means, φ is the azimuthal angle, and p is the pitch. The wire is preferably wound closely packed so that the thread depth and width are on the order of the wire diameter d and α>>p≧d.

Figure 10:
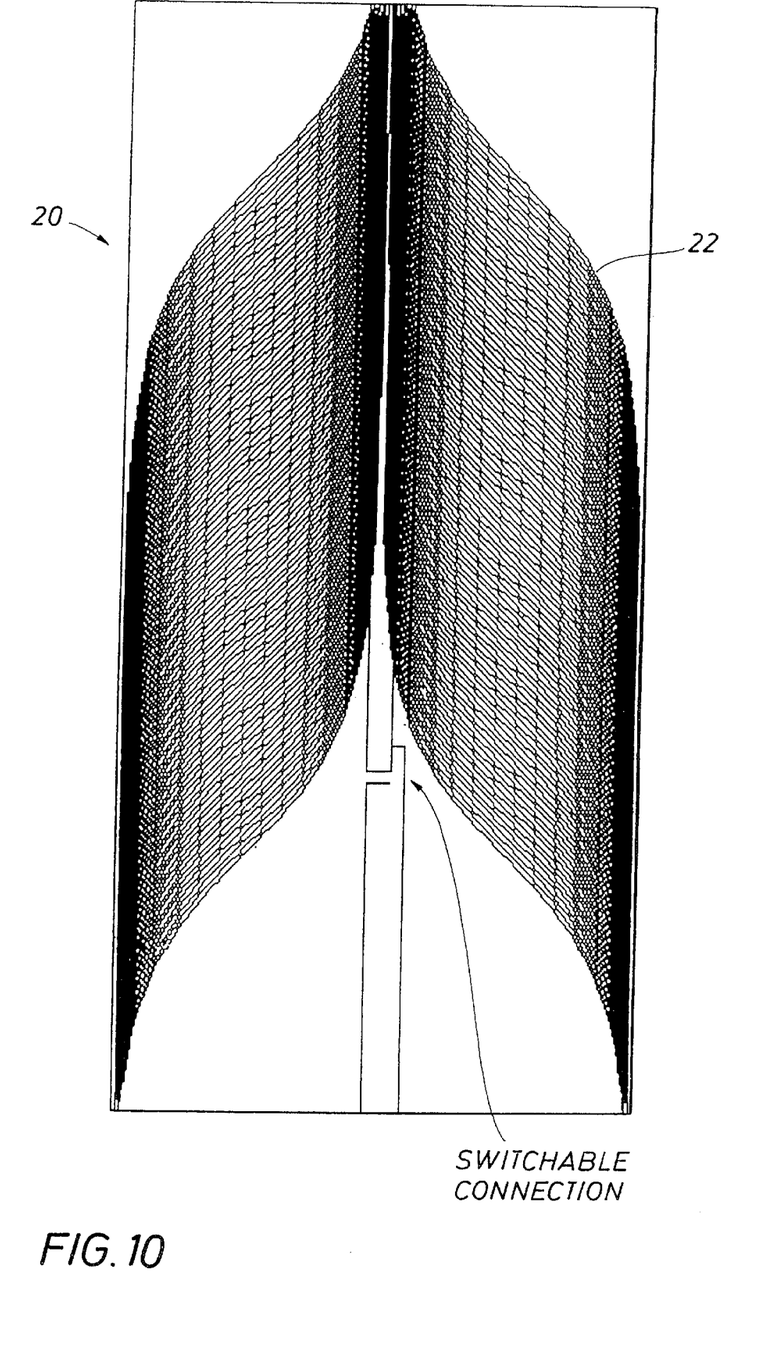
FIG. 10 is an unwrapped view of a shield composed of a strip containing multiple conductive elements in accord with the present invention.

The polarizer strip 20 is constructed so that the conductive elements 22 are everywhere perpendicular to the current in the coil windings. FIG. 10 shows an embodiment of a strip 20 containing conductive elements 22 in accord with the invention. The conductive elements may be embedded, glued, or affixed to the strip in any suitable manner as known in the art. The functional format ƒ(φ') of these conductive elements 22 is derived by $$f(\phi') = \int \frac{-1}{\frac{dz}{d\phi}} d\phi', \quad (5)$$

where $$dz/d\phi = -\alpha \tan\theta \sin\phi', \quad (6)$$

evaluated at φ=φ'. Therefore, $$f(\phi) = \int \frac{1}{\beta\sin\phi} = \frac{1}{2\beta}\ln\left(\frac{1+\cos\phi}{1-\cos\phi}\right), \quad (7)$$

where β=α tan Φ.

Figure 11:
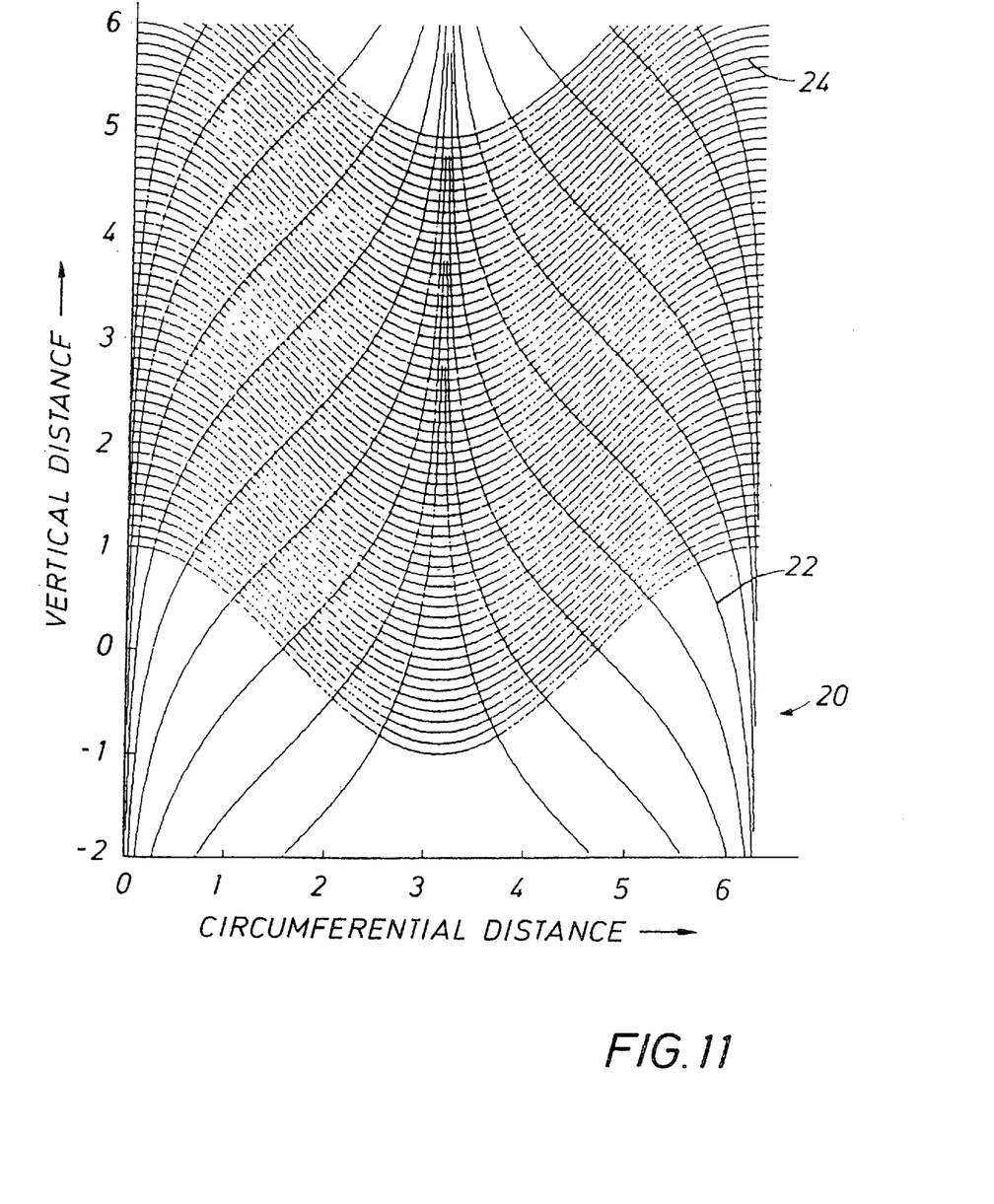
FIG. 11 is a diagram of the shield of FIG. 10 superimposed over the windings of a tilted coil in accord with the present invention.

In addition to providing selective attenuation of EM energy components, the polarizer strip 20 acts as a Faraday shield to reduce capacitive coupling between coils, without attenuating the desired components of the magnetic field. The behavior as a Farady shield is comparable to the behavior of conventional shields used on present generation induction or propagation tools. FIG. 11 shows the strip 20 of FIG. 10 superimposed over the windings 24 of a tilted coil. As shown in FIG. 11, the conductive elements 22 are everywhere perpendicular to the coil windings. Although FIG. 11 shows the superposition of a strip 20 over a coil 14, the same pattern applies to the superposition of a cylindrical shield 10 with sloped slots 12' over a coil 14. The simplified coil and strip 20 described above can be overlaid to create a set of basis magnetic dipoles. These can be used to construct a coil structure that provides selective three-dimensional measurement capability.

While the methods and apparatus of this invention have been described as specific embodiments, it will be apparent to those skilled in the art that variations may be applied to the structures and in the steps or in the sequence of steps of the methods described herein without departing from the concept and scope of the invention. All such similar variations apparent to those skilled in the art are deemed to be within this concept and scope of the invention as defined by the appended claims.

What is claimed is:

1. A shield apparatus for use in conjunction with a well tool, the tool having a longitudinal support means and at least one coil mounted thereon, the coil being adapted to transmit or receive electromagnetic energy including azimuthal, axial, or radial field components, the apparatus comprising:

a flexible strip adapted to surround the coil, the strip being formed of a non-conductive material;

at least one conductive element disposed on the strip, the element configured to form an open loop around the coil when the strip surrounds the coil;

switching means connected to at least one conductive element, the switching means being operative to provide selective closure of the open loop to form a closed loop; and whereby the closed loop provides selective attenuation of at least one of the field components as the component interacts with the shield.

2. The shield apparatus of claim 1, wherein at least one conductive element is disposed on the strip such that the element is centered over the coil when the strip surrounds the coil.

3. The shield apparatus of claim 1, wherein at least one conductive element is disposed on the strip such that the element is perpendicular to the coil when the strip surrounds the coil.

4. The shield apparatus of claim 1, wherein the strip comprises multiple conductive elements disposed therein.

5. The shield apparatus of claim 1, wherein at least one conductive element is disposed on the strip such that the element is sloped at an angle with respect to the longitudinal axis of the support means when the strip surrounds the coil.

6. The shield apparatus of claim 5, wherein at least one conductive element is sloped at an angle such that at least one field component of the transmitted or received electromagnetic energy is allowed to pass through the strip with minimal attenuation when the strip surrounds the coil.

7. The shield apparatus of claim 5, wherein at least one conductive element is sloped at an angle such that a combined axial and azimuthal magnetic field component of the transmitted or received electromagnetic energy is allowed to pass through the strip with minimal attenuation when the strip surrounds the coil.

8. The shield apparatus of claim 5, wherein at least one conductive element is sloped at an angle such that the azimuthal electric field component of the transmitted or received electromagnetic energy is allowed to pass through the strip with minimal attenuation while the axial or radial electric field component is attenuated to restrict its passage through the strip when the strip surrounds the coil.

9. The shield apparatus of claim 1, the strip further comprising at least one conductive element disposed therein such that the element is aligned with the longitudinal axis of the support means when the strip surrounds the coil.

10. The shield apparatus of claim 1, wherein the strip comprises multiple conductive elements disposed therein such that each element is sloped at an angle with respect to the longitudinal axis of the support means when the strip surrounds the coil.

11. The shield apparatus of claim 10, wherein each element has an equal slope angle with respect to the longitudinal axis of the support means when the strip surrounds the coil.

12. The shield apparatus of claim 10, wherein the multiple sloped elements are asymmetrically spaced on the strip.

13. The shield apparatus of claim 10, wherein the multiple sloped elements are symmetrically spaced on the strip.

14. The shield apparatus of claim 10, wherein the multiple sloped elements are asymmetrically oriented on the strip.

15. The shield apparatus of claim 1, the strip further comprising multiple conductive elements disposed therein such that each element is aligned with the longitudinal axis of the support means when the strip surrounds the coil.

16. The shield apparatus of claim 15, wherein the multiple longitudinal elements are asymmetrically spaced on the strip.

17. The shield apparatus of claim 15, wherein the multiple longitudinal elements are symmetrically spaced on the strip.

* * * * *

UNITED STATES PATENT AND TRADEMARK OFFICE
CERTIFICATE OF CORRECTION

PATENT NO.    : 6,380,744 B2
DATED         : April 30, 2002
INVENTOR(S)   : Rosthal et al.

It is certified that error appears in the above-identified patent and that said Letters Patent is hereby corrected as shown below:

<u>Title page,</u>
Item [75], please change the Inventors from "Brian Clark, Sugar Land; Richard A. Rosthal, Houston; Dean M. Homan, Sugar Land; Dzevat Omeragic, Sugar Land; Stephen D. Bonner, Sugar Land; Scott S. Chesser, Richmond; Thomas D. Barber, Houston, all of TX (US)" to -- Richard A. Rosthal, Houston; Dean M. Homan, Sugar Land; Dzevat Omeragic, Sugar Land; Stephen D. Bonner, Sugar Land; Brian Clark, Sugar Land; Scott S. Chesser, Richmond; Thomas D. Barber, Houston, all of TX (US) --

Signed and Sealed this

Twenty-sixth Day of November, 2002

*Attest:*

*Attesting Officer*

JAMES E. ROGAN
*Director of the United States Patent and Trademark Office*